(12) United States Patent
Matsuo et al.

(10) Patent No.: US 11,400,589 B2
(45) Date of Patent: Aug. 2, 2022

(54) GRIPPING SYSTEM AND GRIPPING METHOD

(71) Applicant: THK CO., LTD., Tokyo (JP)

(72) Inventors: Yoshikazu Matsuo, Tokyo (JP); Yuki Katsumata, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 17/437,910

(22) PCT Filed: Mar. 16, 2020

(86) PCT No.: PCT/JP2020/011410
§ 371 (c)(1),
(2) Date: Sep. 10, 2021

(87) PCT Pub. No.: WO2020/189619
PCT Pub. Date: Sep. 24, 2020

(65) Prior Publication Data
US 2022/0097229 A1    Mar. 31, 2022

(30) Foreign Application Priority Data

Mar. 15, 2019 (JP) .............................. JP2019-048266

(51) Int. Cl.
*B25J 9/16* (2006.01)
*B25J 13/08* (2006.01)
*B25J 15/08* (2006.01)

(52) U.S. Cl.
CPC ........... *B25J 9/1612* (2013.01); *B25J 13/082* (2013.01); *B25J 15/08* (2013.01)

(58) Field of Classification Search
CPC ......... B25J 9/1612; B25J 13/082; B25J 15/08
See application file for complete search history.

(56) References Cited

U.S. PATENT DOCUMENTS

2011/0040408 A1*  2/2011  De La Rosa Tames ..................... B25J 15/10 901/29
2014/0132018 A1*  5/2014  Claffee ................ B25J 15/0475 901/31

(Continued)

FOREIGN PATENT DOCUMENTS

CN    206395485 U    8/2017
JP    2007007859 A *  1/2007

(Continued)

OTHER PUBLICATIONS

Office Action dated Oct. 13, 2020, issued in counterpart JP Application No. 2019-048266, with English translation (4 pages).

(Continued)

*Primary Examiner* — Rachid Bendidi
(74) *Attorney, Agent, or Firm* — WHDA, LLP

(57) ABSTRACT

An object of the present invention is to grip a bag-shaped object in which a fluid is sealed with stability in a gripping system having a hand mechanism. A tip end portion of a press-in finger portion of the hand mechanism is brought into contact with the bag-shaped object and pressed into the bag-shaped object, and subsequently, when the pressure detected by a pressure detection unit provided on the single press-in finger portion or the pressure detected by any one of the pressure detection units provided respectively on the press-in finger portions reaches or exceeds a predetermined pressure, a gripping operation, which is an operation for gripping the bag-shaped object using at least two finger portions among the plurality of finger portions of the hand mechanism, is executed in a state where the press-in finger portion is pressed into the bag-shaped object.

5 Claims, 12 Drawing Sheets

(56) References Cited

U.S. PATENT DOCUMENTS

| | | | |
|---|---|---|---|
| 2014/0132020 A1 | 5/2014 | Claffee et al. | |
| 2014/0132021 A1 | 5/2014 | Claffee et al. | |
| 2016/0121489 A1* | 5/2016 | Moore | B25J 9/142 |
| | | | 294/198 |
| 2020/0198157 A1* | 6/2020 | Hirata | B25J 15/0061 |

FOREIGN PATENT DOCUMENTS

| | | | |
|---|---|---|---|
| JP | 2010069584 A * | 4/2010 | |
| JP | 2015071207 A * | 4/2015 | |
| JP | 2015-533669 A | 11/2015 | |
| JP | 2018-192612 A | 12/2018 | |
| JP | 2019-034399 A | 3/2019 | |
| WO | 2019-044923 A1 | 3/2019 | |

OTHER PUBLICATIONS

International Search Report dated May 19, 2020, issued in counterpart International Application No. PCT/JP2020/011410 (2 pages).
Decision to Grant a Patent dated Jan. 12, 2021, issued in counterpart JP Patent Application No. 2019-048266, w/ English translation (5 pages).
Office Action dated Dec. 29, 2021, issued in counterpart CN Application No. 202080021129.4, with English Translation. (13 pages).

\* cited by examiner

[Fig. 1]
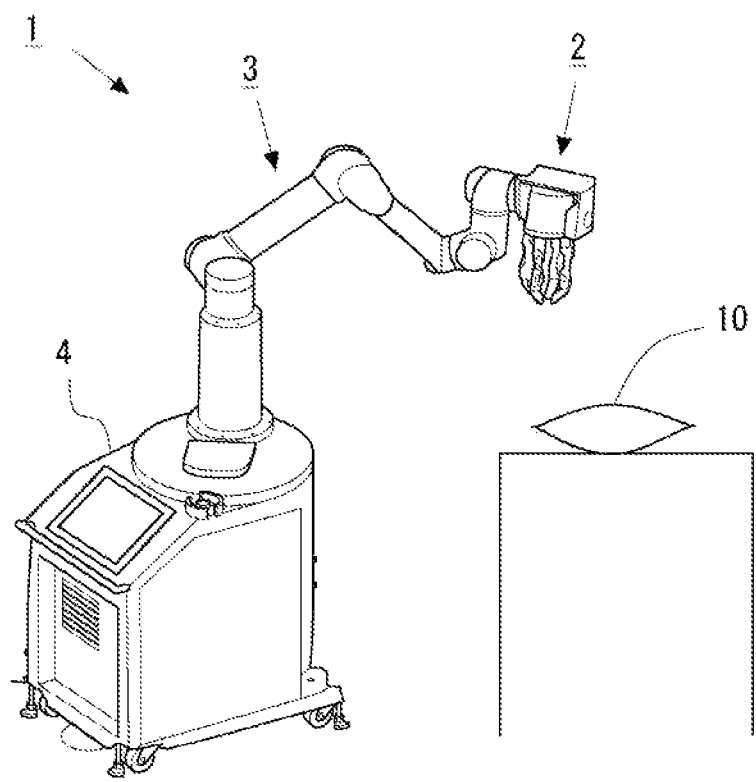

[Fig. 2]
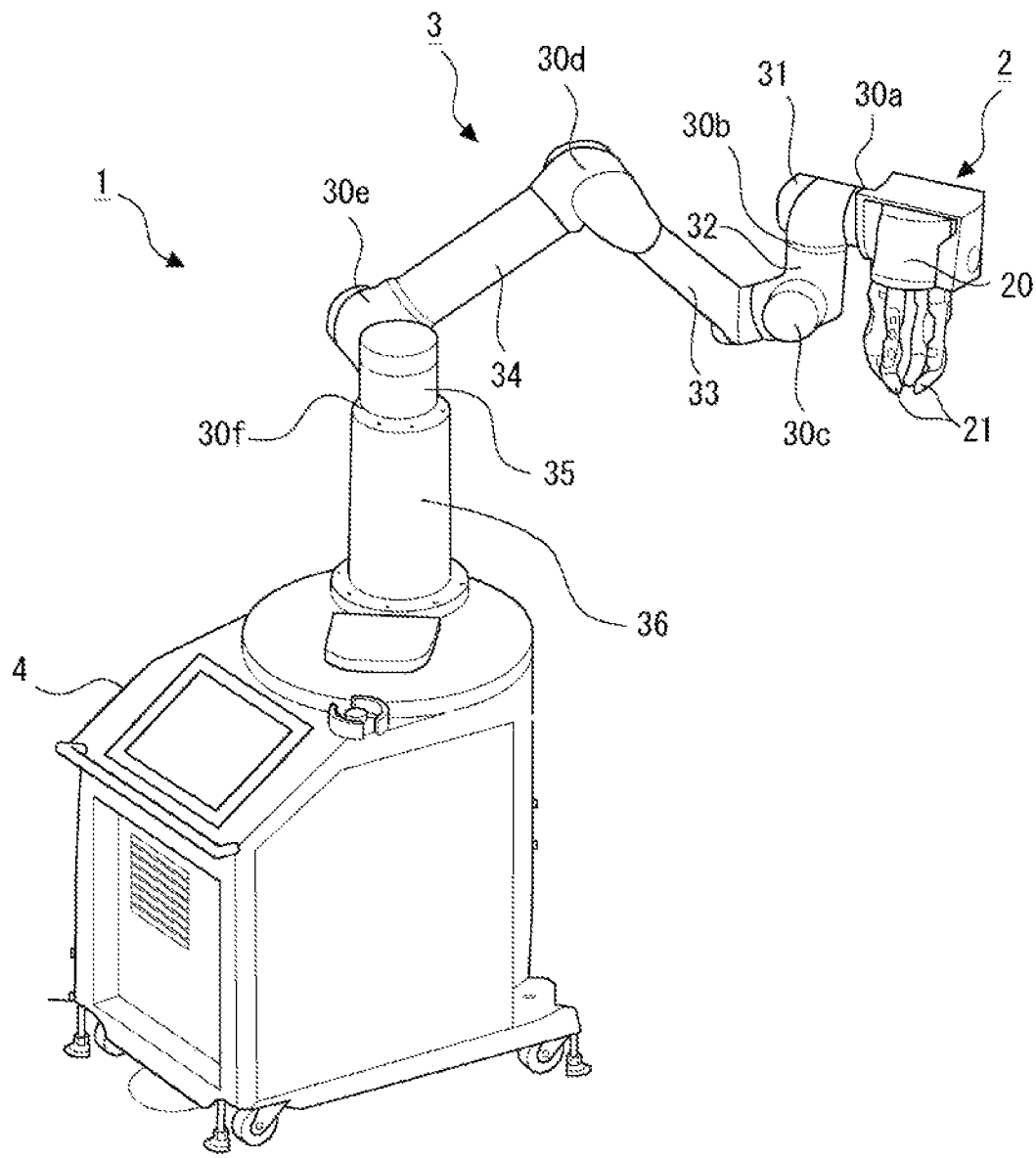

[Fig. 3]
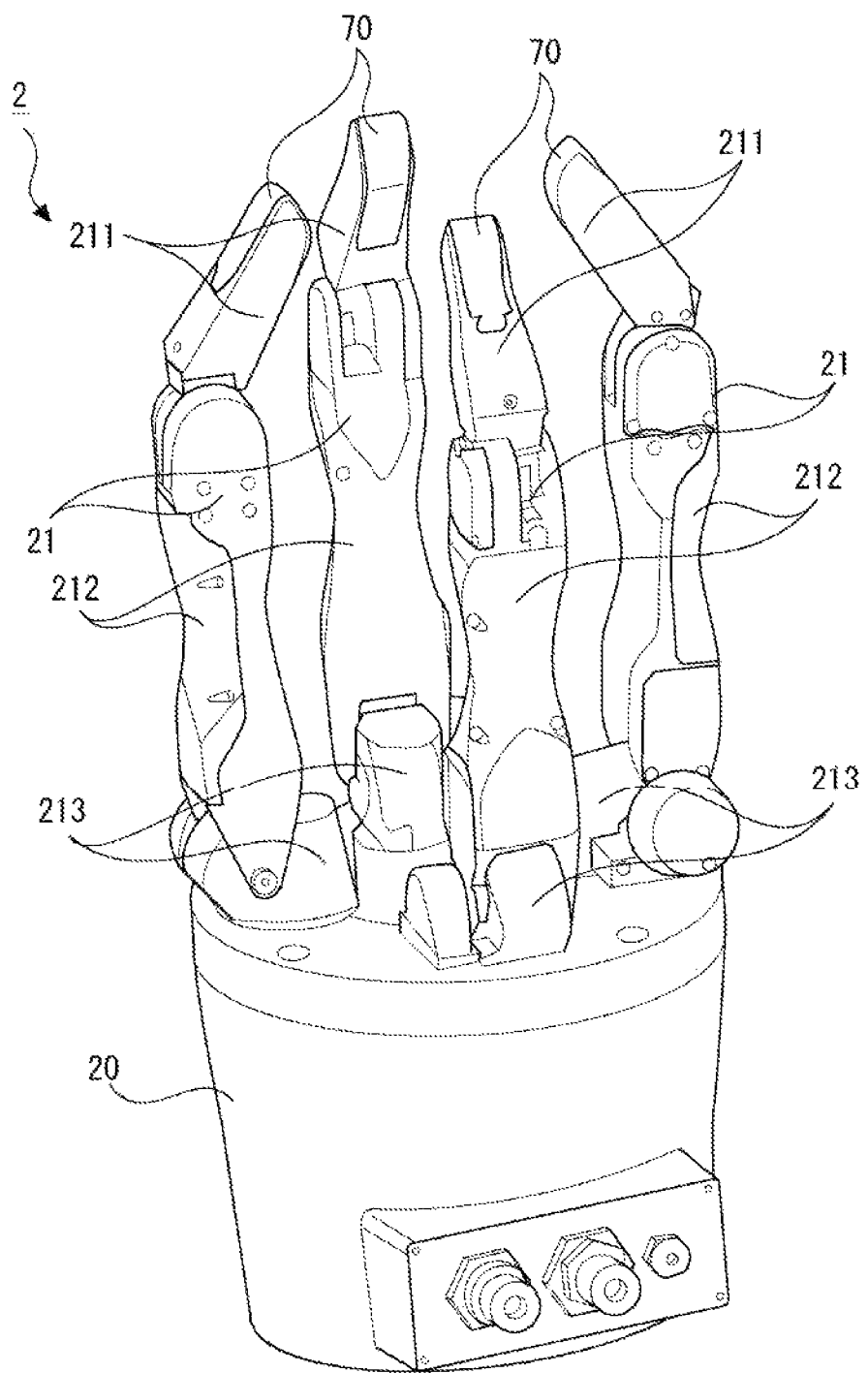

[Fig. 4]
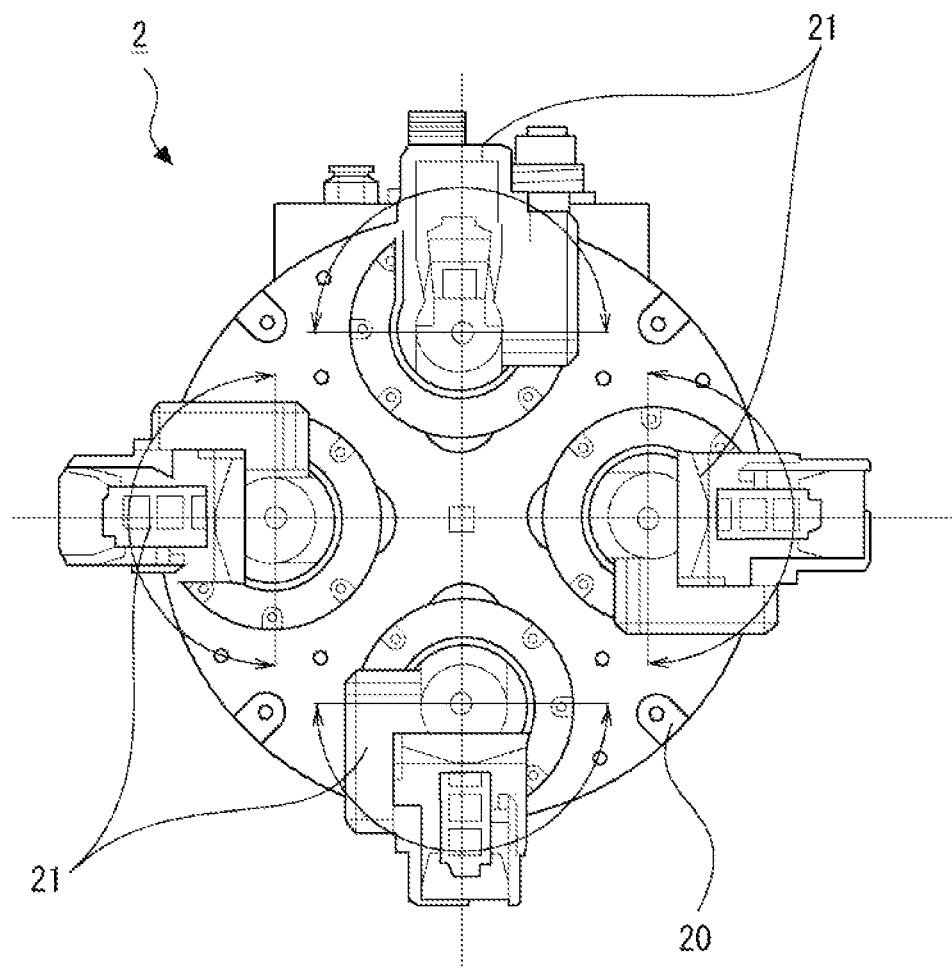

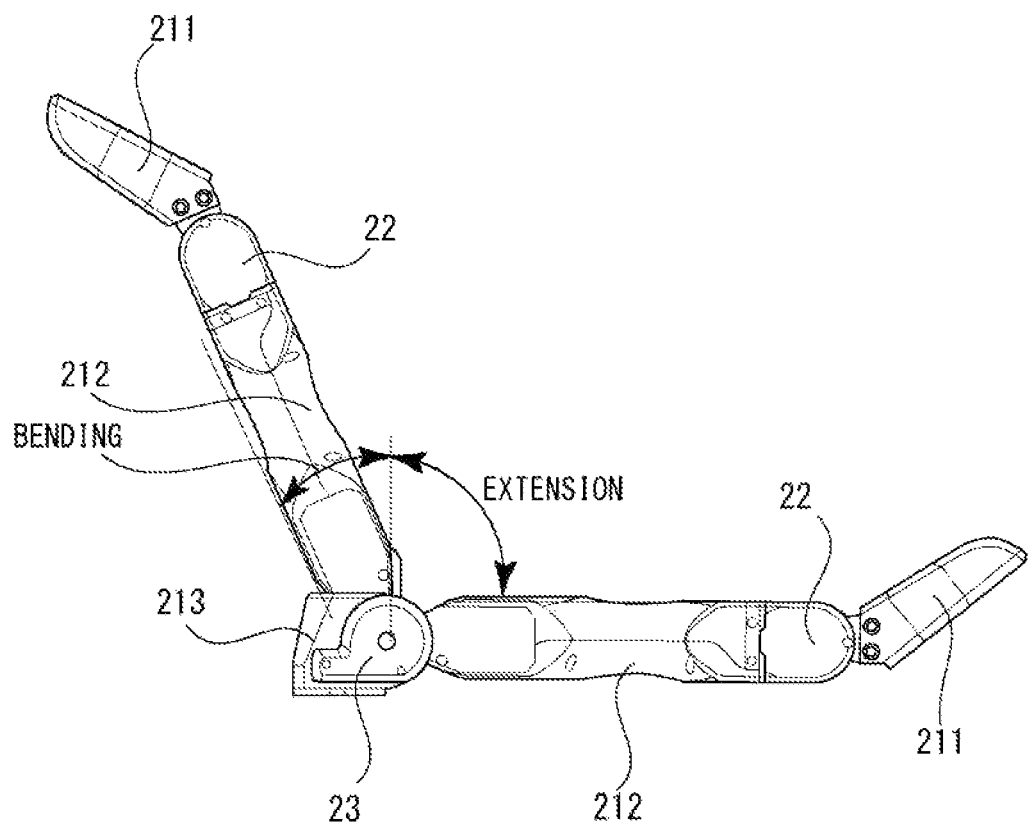
[Fig. 5]

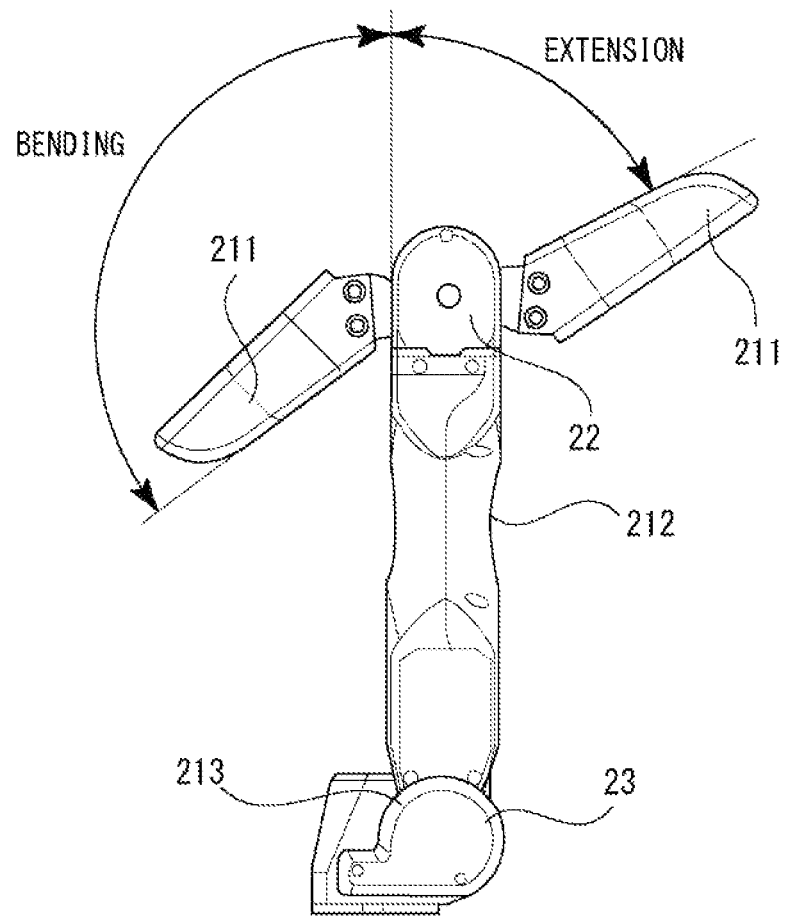
[Fig. 6]

[Fig. 7]
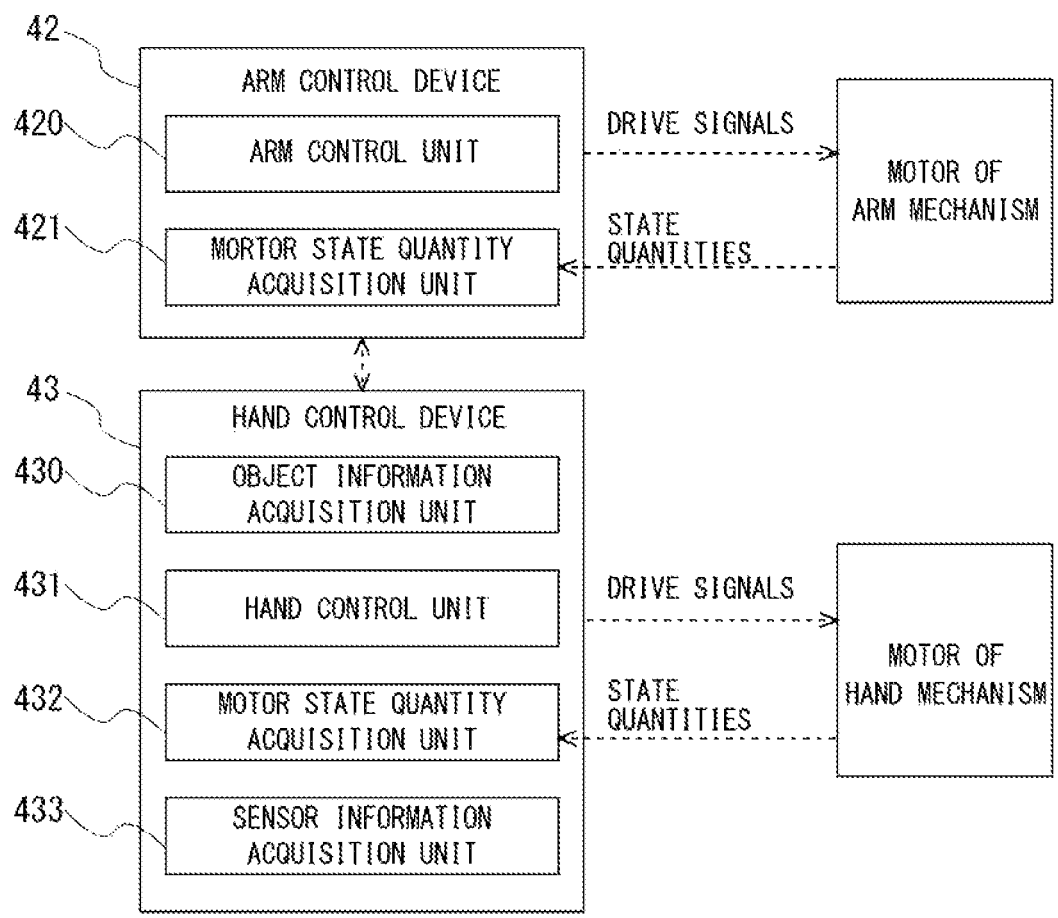

[Fig. 8]
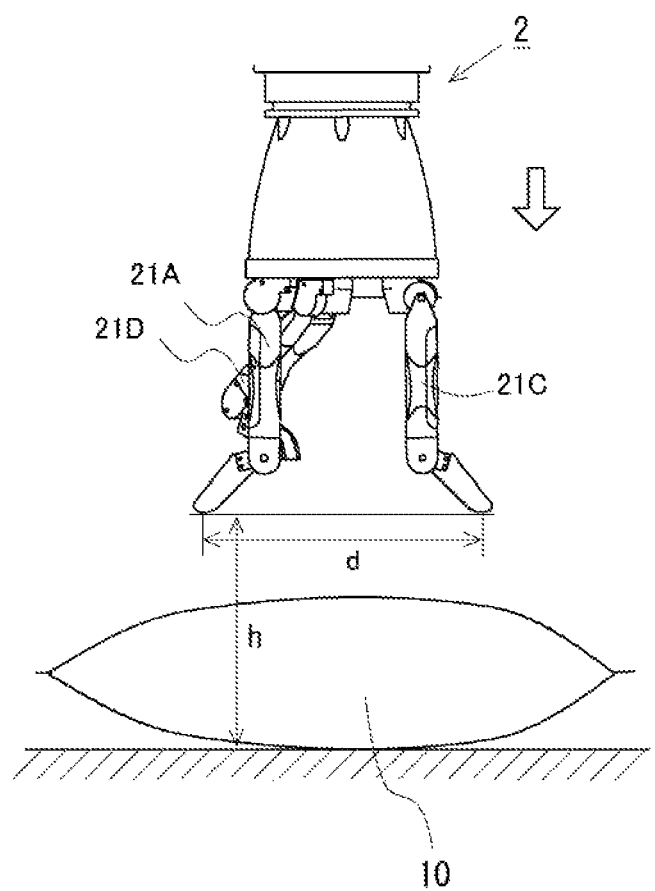

[Fig. 9]
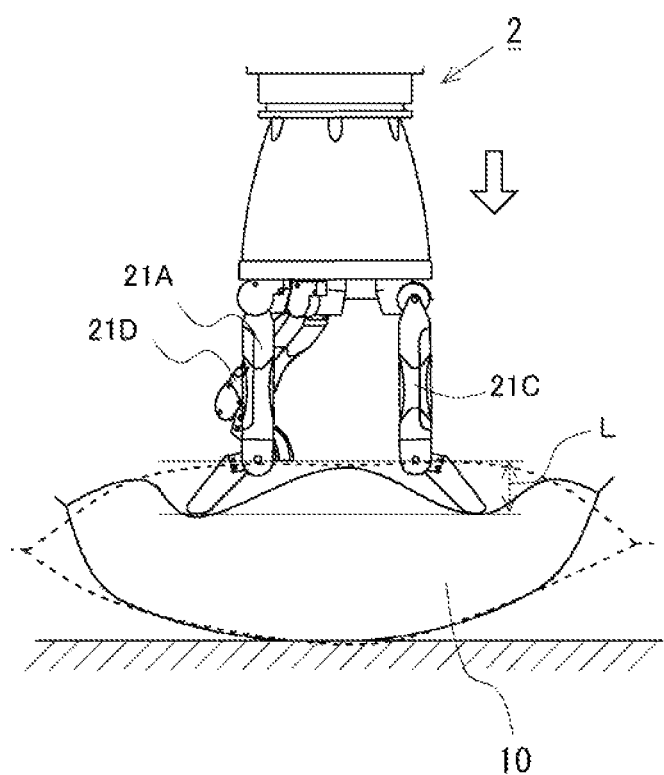

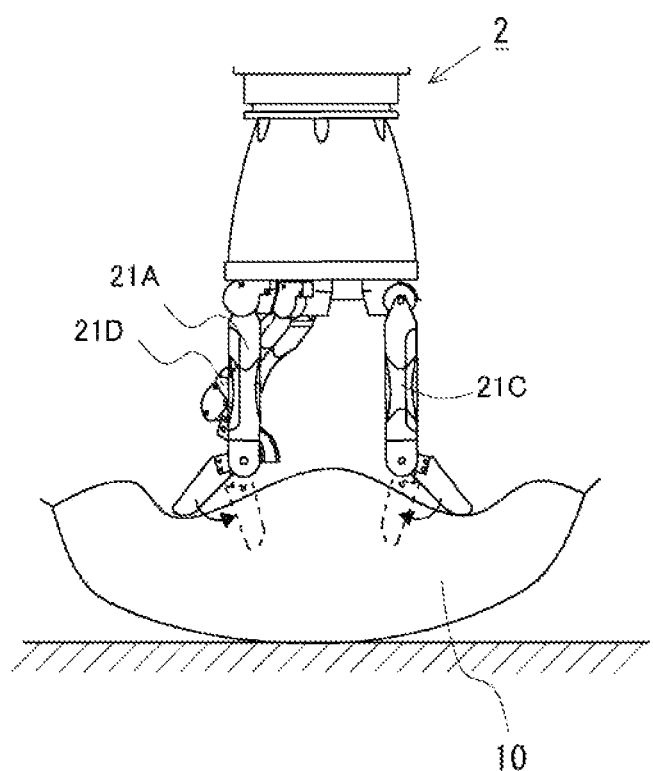
[Fig. 10]

[Fig. 11]
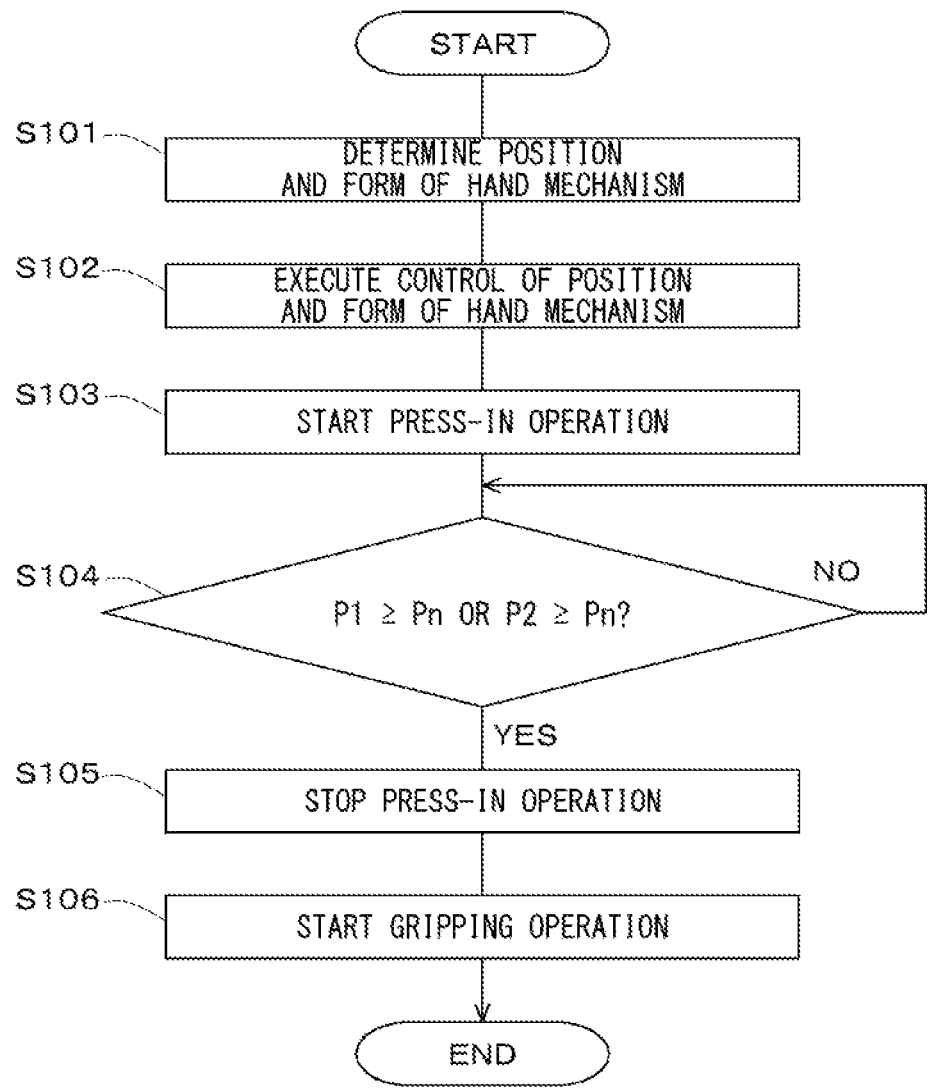

[Fig. 12]
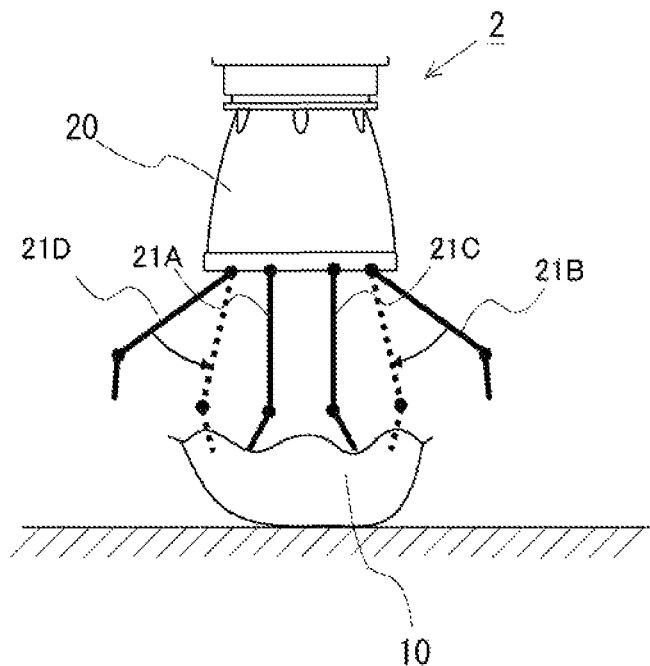

GRIPPING SYSTEM AND GRIPPING METHOD

TECHNICAL FIELD

The present invention relates to a gripping system and a gripping method for gripping an object using a plurality of finger portions.

BACKGROUND ART

A hand mechanism that is attached to a robot arm or the like in order to grip an object using a plurality of finger portions has been developed in the prior art. PTL 1, for example, discloses a hand mechanism having three finger portions (fingers). In the hand mechanism of PTL 1, the three finger portions are structured identically.

CITATION LIST

Patent Literature

[PTL 1] Japanese Translation of PCT Application No. 2015-533669

SUMMARY OF INVENTION

Technical Problem

In a gripping system including a hand mechanism for gripping an object using a plurality of finger portions, the object may be a bag-shaped object with a fluid (a gas or a liquid) sealed in the interior thereof. When this type of bag-shaped object is pressed by the finger portions while being gripped by the hand mechanism, the shape thereof changes easily. Hence, in comparison with an object that is less likely to deform, frictional force is less likely to act thereon, and as a result, it may be difficult to maintain a state in which the bag-shaped object is gripped by the plurality of finger portions.

The present invention has been designed in consideration of this problem, and an object thereof is to provide a technique with which it is possible to grip a bag-shaped object in which a fluid is sealed with stability in a gripping system that includes a hand mechanism for gripping an object using a plurality of finger portions.

Solution to Problem

In a gripping system including a hand mechanism for gripping an object using a plurality of finger portions and a control device for controlling the hand mechanism while gripping the object, when the object is a bag-shaped object with a fluid sealed in the interior thereof, at least one finger portion among the plurality of finger portions of the hand mechanism is used as a press-in finger portion, a pressure detection unit is provided on a tip end portion of the finger portion that serves as the press-in finger portion of the hand mechanism, and when the object is the bag-shaped object, the control device brings the tip end portion of the press-in finger portion of the hand mechanism into contact with the bag-shaped object and presses the tip end portion into the bag-shaped object, and subsequently, when the pressure detected by the pressure detection unit provided on the single press-in finger portion or the pressure detected by any one of the pressure detection units provided respectively on the press-in finger portions reaches or exceeds a predetermined pressure, the control device executes a gripping operation, which is an operation for gripping the bag-shaped object using at least two finger portions among the plurality of finger portions, in a state where the press-in finger portion is pressed into the bag-shaped object.

Advantageous Effects of Invention

According to the present invention, it is possible to grip a bag-shaped object in which a fluid is sealed with stability in a gripping system that includes a hand mechanism for gripping an object using a plurality of finger portions.

BRIEF DESCRIPTION OF DRAWINGS

FIG. 1 is a first schematic view showing a configuration of a gripping system according to an embodiment.

FIG. 2 is a second schematic view showing the configuration of the gripping system according to this embodiment.

FIG. 3 is a perspective view of a hand mechanism according to this embodiment.

FIG. 4 is a top view of the hand mechanism according to this embodiment.

FIG. 5 is a view showing a movement range of a second joint portion of a finger portion on the hand mechanism according to this embodiment.

FIG. 6 is a view showing a movement range of a first joint portion of the finger portion on the hand mechanism according to this embodiment.

FIG. 7 is a block diagram showing function units included respectively in an arm control device and a hand control device according to this embodiment.

FIG. 8 is a view showing the form of the hand mechanism when executing a press-in operation according to a first embodiment.

FIG. 9 is a view showing the hand mechanism and a bag-shaped object during execution of the press-in operation according to the first embodiment.

FIG. 10 is a view showing the hand mechanism and the bag-shaped object during execution of a gripping operation according to the first embodiment.

FIG. 11 is a flowchart showing a control flow of the gripping system when executing gripping of the bag-shaped object according to the first embodiment.

FIG. 12 is a view illustrating a press-in operation and a gripping operation according to a second embodiment.

DESCRIPTION OF EMBODIMENTS

A gripping system according to the present invention includes a hand mechanism for gripping an object using a plurality of finger portions and a control device for controlling the hand mechanism.

In the gripping system according to the present invention, the object to be gripped by the hand mechanism may be a bag-shaped object with a fluid sealed in the interior thereof. Here, when the internal pressure of the bag-shaped object increases in a case where a fluid such as a gas or a liquid is sealed in the bag-shaped object, the bag-shaped object becomes less likely to deform in response to the application of external force. Hence, if the internal pressure of the bag-shaped object is high during a gripping operation, which is an operation for gripping the bag-shaped object using the finger portions of the hand mechanism, the bag-shaped object is less likely to deform when pressed by the finger portions during the gripping operation. As a result, reaction force from the bag-shaped object to the finger portions gripping the bag-shaped object increases. Thus, it is possible to increase the frictional force between the finger portions gripping the bag-shaped object and the bag-shaped object.

Therefore, in the gripping system according to the present invention, when the object is a bag-shaped object with a fluid sealed in the interior thereof, at least one of the plurality of finger portions of the hand mechanism is used as a press-in finger portion. At this time, a pressure detection unit is provided on a tip end portion of the finger portion that serves as the press-in finger portion of the hand mechanism. Here, the pressure detection unit is used to detect the pressure applied to the tip end portion of the finger portion.

The control device brings the tip end portion of the press-in finger portion of the hand mechanism into contact with the bag-shaped object and presses the tip end portion into the bag-shaped object (hereafter, this operation will also be referred to as a "press-in operation") before executing the gripping operation using the hand mechanism. When the press-in operation is performed, the bag-shaped object deforms, leading to an increase in the internal pressure thereof. Further, as the press-in amount by which the press-in finger portion presses in the bag-shaped object during the press-in operation increases, the internal pressure of the bag-shaped object rises. Accordingly, the pressure detected by the pressure detection unit provided on the tip end portion of the press-in finger portion rises.

The control device starts the gripping operation when the pressure detected by any one of the pressure detection units provided respectively on the press-in finger portions reaches or exceeds a predetermined pressure. At this time, the control device executes the gripping operation while maintaining a state in which the press-in finger portion is pressed into the bag-shaped object. Here, the predetermined pressure is a pressure at which sufficient frictional force for gripping the bag-shaped object can be secured between the finger portions of the hand mechanism and the bag-shaped object so that sufficient reaction force acts on the finger portions from the bag-shaped object when the bag-shaped object is gripped by the finger portions during the gripping operation.

According to the present invention, by performing the press-in operation before performing the gripping operation, as described above, the gripping operation can be executed in a state where the internal pressure of the bag-shaped object has been sufficiently increased. Accordingly, when the finger portions of the hand mechanism are pressed against the bag-shaped object during the gripping operation, sufficient frictional force is secured between the finger portions and the bag-shaped object. Thus, it is easier to maintain a state in which the bag-shaped object is gripped by the plurality of finger portions. As a result, the bag-shaped object can be gripped by the hand mechanism with stability.

Furthermore, in the gripping system according to the present invention, at least two finger portions of the hand mechanism may be used as the press-in finger portions. In this case, the press-in operation is performed in a state where at least a predetermined distance is maintained between the tip end portions of the press-in finger portions. By performing the press-in operation using a plurality of press-in finger portions in this manner, the press-in amount by which the press-in finger portions press in the bag-shaped object in order to increase the internal pressure of the bag-shaped object to an approximately identical degree can be reduced in comparison with a case where the press-in operation is performed by one press-in finger portion. By reducing the press-in amount by which the press-in finger portions press in the bag-shaped object in this manner, it is possible to prevent the contents of the bag-shaped object from being damaged during the press-in operation. Moreover, by reducing the press-in amount by which the press-in finger portions press in the bag-shaped object, the time from the start of the press-in operation to the start of the gripping operation can be shortened. As a result, the takt time required to grip the bag-shaped object can be shortened.

Specific embodiments of the present invention will be described below on the basis of the figures. Unless specified otherwise, the technical scope of the invention is not limited only to the dimensions, materials, shapes, relative arrangements, and so on of constituent components described in the embodiments.

First Embodiment

FIGS. 1 and 2 are schematic views showing a configuration of a gripping system according to this embodiment. A gripping system 1 includes a hand mechanism 2 for gripping an object 10, an arm mechanism 3, and a support portion 4. The configurations of the arm mechanism 3, hand mechanism 2, and support portion 4 of the gripping system 1 will now be described in detail.

The hand mechanism 2 is attached to one end of the arm mechanism 3. Further, the support portion 4 is attached to the other end of the arm mechanism 3. The arm mechanism 3 includes a first arm link portion 31, a second arm link portion 32, a third arm link portion 33, a fourth arm link portion 34, a fifth arm link portion 35, and a connecting member 36. A base portion 20 of the hand mechanism 2 is connected to a first joint portion 30a formed on one end side of the first arm link portion 31 of the arm mechanism 3. A motor (not shown) for rotating the hand mechanism 2 relative to the first arm link portion 31 about the first arm link portion 31 is provided in the first joint portion 30a. The other end side of the first arm link portion 31 is connected to one end side of the second arm link portion 32 by a second joint portion 30b. The first arm link portion 31 and the second arm link portion 32 are connected so that respective central axes thereof intersect perpendicularly. A motor (not shown) for rotating the first arm link portion 31 relative to the second arm link portion 32 axially about the other end side thereof is provided in the second joint portion 30b. Further, the other end side of the second arm link portion 32 is connected to one end side of the third arm link portion 33 by a third joint portion 30c. A motor (not shown) for rotating the second arm link portion 32 relative to the third arm link portion 33 is provided in the third joint portion 30c.

Similarly, the other end side of the third arm link portion 33 is connected to one end side of the fourth arm link portion 34 by a fourth joint portion 30d. Furthermore, the other end side of the fourth arm link portion 34 is connected to the fifth arm link portion 35 by a fifth joint portion 30e. A motor (not shown) for rotating the third arm link portion 33 relative to the fourth arm link portion 34 is provided in the fourth joint portion 30d. Moreover, a motor (not shown) for rotating the fourth arm link portion 34 relative to the fifth arm link portion 35 is provided in the fifth joint portion 30e. Further, the fifth arm link portion 35 is connected to the connecting member 36, which is disposed to extend vertically from the support portion 4, by a sixth joint portion 30f. The fifth arm link portion 35 and the connecting member 36 are connected so that respective central axes thereof are coaxial. A motor (not shown) for rotating the fifth arm link portion 35 about the fifth arm link portion 35 and the connecting member 36 is provided in the sixth joint portion 30f. By configuring the arm mechanism 3 in this manner, the arm mechanism 3 can be realized as a mechanism having six degrees of freedom, for example.

(Hand Mechanism)

Next, the configuration of the hand mechanism 2 will be described on the basis of FIGS. 3 to 6. FIG. 3 is a perspective view of the hand mechanism 2. FIG. 4 is a top view of the hand mechanism 2. Note that in FIG. 4, arrows represent rotation ranges of respective finger portions 21. The hand mechanism 2 includes a base portion 20 connected to the arm mechanism 3, and four finger portions 21 provided on the base portion 20. Further, as shown in FIGS. 3 and 4, in the hand mechanism 2, the four finger portions 21 are disposed on the base portion 20 at equal angular intervals (more specifically, at 90 deg intervals) on a circumference centering on a longitudinal direction (a perpendicular direction to the paper surface in FIG. 4) axis of the hand mechanism 2. Furthermore, the four finger portions 21 all have identical structures and identical lengths. Note, however, that the operations of the respective finger portions 21 are controlled independently.

As shown in FIG. 3, each finger portion 21 includes a first finger link portion 211, a second finger link portion 212, and a base end portion 213. The base end portion 213 of the finger portion 21 is connected to the base portion 20. Here, as indicated by arrows in FIG. 4, the base end portion 213 is connected to the base portion 20 so as to be capable of rotating relative to the base portion 20 about a longitudinal direction (a perpendicular direction to the paper surface in FIG. 4) axis of the finger portion 21. Further, in the finger portion 21, one end of the second finger link portion 212 is connected to the base end portion 213. A second joint portion 23 is formed in a connecting portion between the second finger link portion 212 and the base end portion 213. A motor for driving the base end portion 213 to rotate and a motor for driving the second finger link portion 212 to rotate relative to the base end portion 213 are provided in the interior of the base portion 20. According to this configuration, the base end portion 213 is driven to rotate, and in accordance therewith, the entire finger portion 21 is driven to rotate within a range indicated by an arrow in FIG. 4. Furthermore, as shown in FIG. 5, the second joint portion 23 is formed to be capable of bending and extending.

Further, as shown in FIGS. 3, 5, and 6, in the finger portion 21, one end of the first finger link portion 211 is connected to the other end of the second finger link portion 212. A first joint portion 22 is formed in a connecting portion between the first finger link portion 211 and the second finger link portion 212. A motor for driving the first finger link portion 211 to rotate relative to the second finger link portion 212 is provided in the interior of the second finger link portion 212. According to this configuration, as shown in FIG. 6, the first joint portion 22 is formed to be capable of bending and extending.

Moreover, as shown in FIG. 3, in this embodiment, a pressure sensor 70 is provided on the tip end side of the first finger link portion 211 of the finger portion 21. The pressure sensor 70 is a sensor for detecting external force (pressure) acting on the tip end portion of the first finger link portion 211.

(Support Portion)

Next, configurations of an arm control device 42 and a hand control device 43, which are built into the support portion 4, will be described on the basis of FIG. 7. The arm control device 42 is a control device for controlling the arm mechanism 3 of the gripping system 1. The hand control device 43 is a control device for controlling the hand mechanism 2 of the gripping system 1. FIG. 7 is a block diagram showing respective function units included in the arm control device 42 and the hand control device 43.

The arm control device 42 is configured to include a plurality of drivers that generate drive signals for driving the motors provided in the respective joint portions of the arm mechanism 3, the drive signal from each driver being supplied to the corresponding motor. The arm control device 42 also includes a computer having a calculation processing device and a memory. The arm control device 42 includes an arm control unit 420 and a motor state quantity acquisition unit 421 as function units. These function units are formed by executing a predetermined control program on the computer included in the arm control device 42.

The arm control unit 420 controls the motors provided respectively in the joint portions 30a, 30b, 30c, 30d, 30e, 30f of the arm mechanism 3 by supplying the drive signals from the respective drivers thereto on the basis of object information acquired by an object information acquisition unit 430, to be described below, which serves as a function unit of the hand control device 43. The arm control unit 420 moves the arm mechanism 3 by controlling the respective motors, whereby the position of the hand mechanism 2 is moved to a desired position (a position in which the object 10 can be gripped by the hand mechanism 2). Further, each of the motors provided in the joint portions 30a, 30b, 30c, 30d, 30e, 30f of the arm mechanism 3 is provided with an encoder (not shown) for detecting state quantities (a rotation position and a rotation speed of a rotary shaft of the motor, and so on) relating to the rotation state of the corresponding motor. The state quantities of the motors, detected by the encoders of the respective motors, are input into the motor state quantity acquisition unit 421 of the arm control device 42. Then, on the basis of the state quantities of the respective motors, input into the motor state quantity acquisition unit 421, the arm control unit 420 servo-controls the respective motors so that the hand mechanism 2 moves to the desired position.

Furthermore, the hand control device 43 is configured to include a plurality of drivers that generate drive signals for driving the motors provided in the hand mechanism 2, the drive signal from each driver being supplied to the corresponding motor. The hand control device 43 also includes a computer having a calculation processing device and a memory. The hand control device 43 includes the object information acquisition unit 430, a hand control unit 431, a motor state quantity acquisition unit 432, and a sensor information acquisition unit 433 as function units. These function units are formed by executing a predetermined control program on the computer included in the hand control device 43.

The object information acquisition unit 430 acquires object information, which is information relating to the object to be gripped by the hand mechanism 2. Here, the object information includes information relating to the type, shape, dimensions, and position of the object, information about the peripheral environment of the object (information relating to objects other than the object existing on the periphery of the object, for example information relating to the shape of a container housing the object and an arrangement of objects in the container), and so on. The object information acquisition unit 430 may acquire object information input by the user. Alternatively, when a visual sensor for capturing an image including the object is provided, the object information acquisition unit 430 may acquire the object information from the image captured by the visual sensor.

Further, the hand control unit 431 controls the motors for driving the respective finger portions 21 of the hand mechanism 2 by supplying drive signals from the drivers thereto on the basis of the object information acquired by the object information acquisition unit 430. As a result, the object 10 is gripped by the plurality of finger portions 21 of the hand mechanism 2. Moreover, each motor of the hand mechanism 2 is provided with an encoder (not shown) for detecting state quantities (the rotation position and rotation speed of the rotary shaft of the motor, and so on) relating to the rotation state of the corresponding motor. The state quantities of the motors, detected by the encoders of the motors, are input into the motor state quantity acquisition unit 432 of the hand control device 43. Then, on the basis of the state quantities of the motors, input into the motor state quantity acquisition unit 432, the hand control unit 431 servo-controls the motors of the respective finger portions 21 so that the plurality of finger portions 21 grip the object.

The hand control device 43 also includes a sensor information acquisition unit 433. Detection values from the pressure sensors 70 provided in the first finger link portions 211 of the respective finger portions 21 of the hand mechanism 2 are input into the sensor information acquisition unit 433. Then, when the pressure sensors 70 detect contact with the object by the finger portions 21, the hand control unit 431 can control the motors of the respective finger portions 21 on the basis of detection signals therefrom.

Note that in FIG. 7, the arm control device 42 and the hand control device 43 are shown separately as control devices included in the gripping system, but as a different method, a configuration in which the respective function units are formed in a single control device integrating the two devices may be employed. Further, likewise in a case where the control devices included in the gripping system are separated into the arm control device 42 and the hand control device 43, the function units shown in FIG. 7 may essentially be formed in either of the control devices, as long as no technical inconsistencies occur as a result, and information may be exchanged appropriately as required between the arm control device 42 and the hand control device 43. A configuration in which some of the function units of either the arm control device 42 or the hand control device 43 are formed in a separate control device to the arm control device 42 and the hand control device 43 may also be employed.

(Gripped Object)

In the gripping system 1 according to this embodiment, the gripped object 10 may be a bag-shaped object in which a fluid (a gas or a liquid) is sealed. A bag of snacks such as potato chips or popcorn may be cited as an example of the bag-shaped object 10 in which a gas is sealed. Further, a bag of pickles or a bag of liquid detergent may be cited as an example of the bag-shaped object 10 in which a liquid is sealed. When an attempt is made to grip the bag-shaped object 10 in which a fluid is sealed using the hand mechanism 2, the shape of the bag-shaped object 10 changes easily when pressed by the finger portions 21 used for gripping (also referred to hereafter as gripping finger portions). When the bag-shaped object 10 deforms due to the pressure applied thereto by the gripping finger portions, reaction force received by the gripping finger portions from the bag-shaped object 10 decreases. If, as a result, it becomes difficult to secure sufficient frictional force between the gripping finger portions and the bag-shaped object, it may be difficult to maintain a state in which the bag-shaped object 10 is gripped by the gripping finger portions.

(Press-in Operation)

Hence, in this embodiment, when the bag-shaped object 10 with a fluid sealed therein is gripped by the hand mechanism 2, a press-in operation for bringing the tip end portions of the finger portions 21 of the hand mechanism 2 into contact with the bag-shaped object 10 and pressing the tip end portions into the bag-shaped object 10 is executed before executing the gripping operation, which is an operation for gripping the bag-shaped object using the gripping finger portions. When the press-in operation is performed in this manner, the bag-shaped object 10 deforms, making it possible to increase the internal pressure of the bag-shaped object 10. When the gripping operation is performed in a state where the internal pressure of the bag-shaped object 10 has been sufficiently raised by executing the press-in operation, the shape of the bag-shaped object 10 is unlikely to change even when the bag-shaped object 10 is pressed by the gripping finger portions. As a result, sufficient reaction force acts on the gripping finger portions from the bag-shaped object 10. Thus, sufficient frictional force for gripping the bag-shaped object 10 can be secured between the gripping finger portions and the bag-shaped object 10.

The press-in operation according to this embodiment will be described in detail below on the basis of FIGS. 8 and 9. Here, the press-in operation is executed using the two finger portions 21A and 21C, among the four finger portions 21 of the hand mechanism 2, as press-in finger portions. Note that the press-in operation is realized by controlling the arm mechanism 3 using the arm control unit 420 of the arm control device 42 and controlling the hand mechanism 2 using the hand control unit 431 of the hand control device 43. FIG. 8 is a view showing the form of the hand mechanism 2 when executing the press-in operation using the finger portions 21A and 21C. Note that in FIG. 8, for convenience, the finger portion 21B has been omitted. A black-outlined arrow in FIG. 8 shows a press-in direction in which the bag-shaped object 10 is pressed in. The arm control unit 420 controls the arm mechanism 3 to move the hand mechanism 2 to a suitable position for performing the press-in operation using the finger portions 21A and 21C. More specifically, the arm control unit 420 moves the hand mechanism 2 to a position where the tip end portions of the fingers 21A and 21C can be brought into contact with the bag-shaped object 10 by moving the hand mechanism 2 in the push-in direction. Further, the hand control unit 431 controls the forms of the respective finger portions 21 so that the tip end portions of the press-in finger portions 21A and 21C can be brought into contact with the bag-shaped object 10. A distance d between the tip end portions of the press-in finger portions 21A and 21C at this time is set at no less than a predetermined distance.

Furthermore, in this embodiment, as shown in FIG. 8, heights h of the respective tip end portions of the press-in finger portions 21A and 21C relative to a plane that is perpendicular to the press-in direction are set to be equal. In so doing, the respective tip end portions of the press-in finger portions 21A and 21C can easily be brought into contact with the bag-shaped object 10. Also, the respective tip end portions of the press-in finger portions 21A and 21C can be pressed into the bag-shaped object 10 evenly. Note, however, that the heights of the respective tip end portions of the press-in finger portions 21A and 21C relative to a plane that is perpendicular to the press-in direction do not necessarily have to be equal. In other words, it is sufficient for the respective tip end portions of the press-in finger portions 21A and 21B to be arranged so that the tip end portions can be brought into contact with the bag-shaped object 10 during the press-in operation.

Further, the heights of the tip end portions of the finger portions 21B and 21D not used in the press-in operation relative to a plane that is perpendicular to the press-in direction are set to be higher than the height h. By arranging the tip end portions of the finger portions 21 in this manner, it is possible to bring only the tip end portions of the press-in finger portions 21A and 21C into contact with the bag-shaped object 10 during the press-in operation. Note, however, that as long as the finger portions 21 are arranged so that it is possible to bring only the tip end portions of the press-in finger portions 21A and 21C into contact with the bag-shaped object 10, the heights of the tip end portions of the finger portions 21B and 21D not used in the press-in operation relative to a plane that is perpendicular to the press-in direction may be lower than the height of the press-in finger portions 21A and 21C.

Control for realizing the form required for the press-in operation, as described above, is executed on the basis of the object information acquired by the object information acquisition unit 430, which includes information relating to the type, shape, dimensions, and position of the object serving as the bag-shaped object 10, and so on. Note that where the bag-shaped object 10 is pressed in by the press-in finger portions and the press-in direction of the press-in finger portions can be determined as appropriate by the user. The press-in positions and press-in direction may also be determined by the hand control unit 431 and the arm control unit 420 on the basis of the object information acquired by the object information acquisition unit 430. Moreover, the press-in finger portions are not limited to the finger portions 21A and 21C and other combinations of the finger portions 21 may be used. Once the control for realizing the position and form of the hand mechanism 2 shown in FIG. 8 is complete, the arm control unit 420 controls the arm mechanism 3 to start the press-in operation by moving the hand mechanism 2 in the direction of the black-outlined arrow shown in FIG. 8.

FIG. 9 is a view showing the hand mechanism 2 and the bag-shaped object 10 during execution of the press-in operation performed on the bag-shaped object 10 by the press-in finger portions 21A and 21C. Note that a black-outlined arrow in FIG. 9 shows the press-in direction in which the bag-shaped object 10 is pressed in. When the press-in operation is started, first, the tip end portions of the press-in finger portions 21A and 21C contact the bag-shaped object 10. The press-in operation is then continued in the direction of the black-outlined arrow in FIG. 9. As a result, the bag-shaped object 10 deforms, leading to a corresponding increase in the internal pressure of the bag-shaped object 10. As the press-in amount by which the press-in finger portions 21A and 21C press in the bag-shaped object 10 during the press-in operation increases, the internal pressure of the bag-shaped object 10 rises. Here, the press-in amount can be defined as an amount of displacement of the tip end portions of the press-in finger portions 21A and 21C in the press-in direction (the direction of the black-outlined arrow in FIG. 9) from the position in which the tip end portions of the press-in finger portions 21A and 21C contact the bag-shaped object 10 following the start of the press-in operation. Dotted lines in FIG. 9 illustrate the bag-shaped object 10 at the point where the press-in finger portions 21A and 21C contact the bag-shaped object 10. In FIG. 9, the press-in amount of the press-in finger portions 21A and 21C during execution of the press-in operation is denoted by L.

At this time, the pressure sensors 70 disposed on the tip end portions of the press-in finger portions 21A and 21C detect the pressure received from the bag-shaped object 10. Hence, when the internal pressure of the bag-shaped object 10 rises in accordance with the increase in the press-in amount by which the press-in finger portions 21A and 21C press in the bag-shaped object 10, the pressure detected by the pressure sensors 70 disposed on the tip end portions of the press-in finger portions 21A and 21C also rises. The sensor information acquisition unit 433 acquires the pressure values detected by the pressure sensors 70 provided respectively on the press-in finger portions 21A and 21C as independent values. When the pressure detected by any one of the pressure sensors 70 disposed respectively on the press-in finger portions 21A and 21C and acquired by the sensor information acquisition unit 433 reaches or exceeds a predetermined pressure, the arm control unit 420 halts driving of the arm mechanism 3 for moving the hand mechanism 2 in the direction of the black-outlined arrow in FIG. 9. As a result, the press-in operation performed on the bag-shaped object 10 is stopped. Here, the predetermined pressure is a pressure at which sufficient frictional force for gripping the bag-shaped object 10 can be secured between the gripping finger portions used for gripping and the bag-shaped object during the gripping operation, to be described below. The predetermined pressure can also be determined as appropriate by the user on the basis of experiments or the like. Alternatively, the sensor information acquisition unit 433 may determine the predetermined pressure on the basis of the object information acquired by the object information acquisition unit 430. Note that during the press-in operation, the respective motors of the press-in finger portions 21A and 21C are servo-controlled by the hand control unit 431 so as not to change the positions of the tip end portions of the press-in finger portions 21A and 21C on the hand mechanism 2. Further, in this embodiment, the pressure sensor 70 is disposed on all of the finger portions 21 of the hand mechanism 2. To realize the press-in operation, however, the pressure sensor 70 need only be disposed on the tip end portions of the finger portions (in this embodiment, the finger portion 21A and the finger portion 21C) designated as the press-in finger portions. By disposing the pressure sensor 70 on the tip end portions of the press-in finger portions, it is possible to determine whether or not the internal pressure of the bag-shaped object 10 has risen to a degree at which the gripping operation can be executed.

(Gripping Operation)

Next, the gripping operation according to this embodiment will be described in detail on the basis of FIG. 10. FIG. 10 is a view showing the hand mechanism 2 and the bag-shaped object 10 during execution of the gripping operation, in which the finger portions 21A and 21C used as the press-in finger portions during the press-in operation are used as gripping finger portions. In this embodiment, the gripping operation is executed after the press-in operation is stopped. At this time, the gripping operation is executed while maintaining the state at the point where the press-in operation is stopped, in which the press-in finger portions 21A and 21C are pressed into the bag-shaped object 10. More specifically, as shown in FIG. 10, the hand control unit 431, using the finger portions 21A and 21C that were used as the press-in finger portions as gripping finger portions, bends the first joint portions 22A and 22C of the finger portions 21A and 21C (in FIG. 10, arrows indicate the directions in which the first joint portions 22A and 22C of the finger portions 21A and 21C are bent) while maintaining a state in which the gripping finger portions 21A and 21C are pressed into the bag-shaped object 10. In so doing, the distance between the tip end portions of the gripping finger portions 21A and 21C shortens, whereby the gripping operation, i.e., the operation for gripping the bag-shaped object 10 using the gripping finger portions 21A and 21C, is realized. Note that the hand control unit 431 may also realize the gripping operation at this time by bending the second joint portions 23A and 23C of the gripping finger portions 21A and 21C. Here, even when the first joint portions 22A and 22C and/or the second joint portions 23A and 23C of the gripping finger portions 21A and 21C are bent, the press-in amount (the press-in amount L shown in FIG. 9) by which the tip end portions of the finger portions 21A and 21C pressed in the bag-shaped object 10 at the point where the press-in operation was stopped is maintained. Therefore, sufficient reaction force acts on the gripping finger portions 21A and 21C from the bag-shaped object 10. Accordingly, sufficient frictional force for gripping the bag-shaped object 10 is generated between the gripping finger portions 21A and 21C and the bag-shaped object 10. Hence, the state in which the bag-shaped object 10 is gripped by the gripping finger portions 21A and 21C can easily be maintained. As a result, the bag-shaped object 10 can be gripped by the hand mechanism 2 with stability.

<Control Flow>

Next, a control flow of the gripping system when executing gripping of the bag-shaped object 10 according to this embodiment will be described on the basis of a flowchart shown in FIG. 11. This control flow is realized by executing a predetermined control program in the arm control unit 420 of the arm control device 42 and the hand control unit 431 of the hand control device 43.

In this flow, first, in S101, the position and form of the hand mechanism 2 required to execute the press-in operation are determined on the basis of the object information acquired by the object information acquisition unit 430 in relation to the bag-shaped object 10. Next, in S102, the position and form of the hand mechanism 2 are controlled to the position and form determined in S101. Thus, the position and form of the hand mechanism 2 required to execute the press-in operation according to this embodiment, as shown in FIG. 8, are realized.

Next, in S103, the press-in operation is started. More specifically, movement of the hand mechanism 2, which is in the form required for the press-in operation, in the press-in direction (the direction of the black-outlined arrows in FIGS. 8 and 9) is started. As described above, when the press-in operation is performed, the tip end portions of the press-in finger portions 21A and 21C of the hand mechanism 2 are brought into contact with the bag-shaped object 10 and then pressed into the bag-shaped object 10. Next, in S104, a determination is made as to whether or not one of pressure values P1 and P2 detected respectively by the pressure sensors 70 provided on the press-in finger portions 21A and 21C and acquired by the sensor information acquisition unit 433 has reached or exceeded a predetermined pressure Pn. When the determination of S104 is negative, the processing of S104 is executed again. In this case, the press-in operation is continued. In other words, movement of the hand mechanism 2 in the press-in direction is continued. As a result, the press-in amount by which the tip end portions of the press-in finger portions 21A and 21C of the hand mechanism 2 press in the bag-shaped object 10 increases.

When, on the other hand, the determination of S104 is affirmative, next, in S105, the press-in operation is stopped. In other words, movement of the hand mechanism 2 in the press-in direction is stopped. Thereafter, the position of the hand mechanism 2 is maintained in the position at the point where the press-in operation was stopped. When the press-in operation is stopped in S105, the processing of S106 is executed. In S106, the gripping operation performed by the gripping finger portions 21A and 21C is started. Accordingly, the bag-shaped object 10 is gripped by the finger portions 21A and 21C while maintaining the state in which the tip end portions of the press-in finger portions 21A and 21C of the hand mechanism 2 are pressed into the bag-shaped object 10.

Note that in this embodiment, the gripping operation performed by the gripping finger portions 21A and 21C is started after the press-in operation performed by the press-in finger portions 21A and 21C is stopped. However, when the pressure detected by any one of the pressure sensors 70 provided respectively on the press-in finger portions 21A and 21C reaches or exceeds the predetermined pressure as a result of the press-in operation, the gripping operation may be started while continuing the press-in operation.

Modified Example 1

In the above embodiment, the two finger portions 21A and 21C are used as the press-in finger portions. However, the press-in finger portions are not limited to two finger portions. In other words, four finger portions 21 or three finger portions 21 of the hand mechanism 2 may be used as the press-in finger portions. Likewise in this case, similarly to the above embodiment, the press-in operation is executed after securing predetermined intervals between the tip end portions of the press-in finger portions. Note that likewise in a case where four finger portions 21 or three finger portions 21 of the hand mechanism 2 are used as the press-in finger portions, the pressure sensor 70 is disposed on the tip end portion of at least each of the finger portions 21 used as the press-in finger portions. Further, likewise in a case where four finger portions 21 or three finger portions 21 of the hand mechanism 2 are used as the press-in finger portions, the gripping operation can be performed using the finger portions 21 used as the press-in finger portions as gripping finger portions. Note that the number of press-in finger portions can be determined as appropriate by the user. Alternatively, the number of press-in finger portions may be determined by the hand control unit 431 on the basis of the object information acquired by the object information acquisition unit 430.

Modified Example 2

Further, as long as at least two finger portions 21 of the hand mechanism 2 are used in the gripping operation, it is possible to grip the bag-shaped object 10. Therefore, it is not always necessary to use all of the finger portions 21 used as the press-in finger portions as gripping finger portions. In other words, when three finger portions 21 of the hand mechanism 2 are used as the press-in finger portions, the gripping operation may be performed using two of the three press-in finger portions as gripping finger portions. Furthermore, when four finger portions 21 of the hand mechanism 2 are used as the press-in finger portions, the gripping operation may be performed using two or three of the four press-in finger portions as gripping finger portions. Note that likewise in these cases, the gripping operation is executed by the gripping finger portions while maintaining the state in which the tip end portions of the plurality of press-in finger portions are pressed into the bag-shaped object 10. Moreover, different finger portions 21 to the finger portions 21 used as the press-in finger portions may be used as the gripping finger portions.

Second Embodiment

The schematic configuration of the gripping system according to this embodiment is similar to the first embodiment, described above. In this embodiment, the press-in operation is executed using some of the four finger portions 21 of the hand mechanism 2 as the press-in finger portions. The gripping operation is then executed using the finger portions 21, of the four finger portions 21 of the hand mechanism 2, that were not used as the press-in finger portions. An example in which, of the finger portions 21 of the hand mechanism 2, the two finger portions 21A and 21C are used as the press-in finger portions and the two remaining finger portions 21B and 21D are used as the gripping finger portions will be described below on the basis of FIG. 12. FIG. 12 is a view illustrating the press-in operation and the gripping operation according to this embodiment.

In this embodiment, similarly to the case of the first embodiment, shown in FIGS. 8 and 9, the press-in operation is executed using the finger portions 21A and 21C of the hand mechanism 2 as the press-in finger portions. Note that likewise in this embodiment, at least a predetermined distance is maintained between the tip end portions of the press-in finger portions 21A and 21C. Further, in this embodiment, as shown in FIG. 12, the form of the finger portions 21B and 21D that are not used as the press-in finger portions is controlled to ensure that the finger portions 21B and 21D do not contact the bag-shaped object 10 during the press-in operation. The press-in operation is stopped when the pressure detected by any one of the pressure sensors 70 provided respectively on the press-in finger portions 21A and 21C reaches or exceeds the predetermined pressure.

When the press-in operation is stopped, the gripping operation is executed using the finger portions 21B and 21D that were not used as the press-in finger portions as gripping finger portions. At this time, the gripping operation is executed while maintaining the state at the point where the press-in operation was stopped, in which the press-in finger portions 21A and 21C are pressed into the bag-shaped object 10. Note that the gripping operation is realized by having the hand control unit 431 drive the respective joint portions of the gripping finger portions 21B and 21D in a direction for gripping the bag-shaped object 10 using the gripping finger portions 21B and 21D (in FIG. 12, an arrow indicates the direction in which the joint portions of the gripping finger portions 21B and 21D are driven). Note that during the gripping operation, the hand control unit 431 servo-controls the respective motors of the press-in finger portions 21A and 21C so that the positions of the press-in finger portions 21A and 21C are not changed.

In this embodiment, as described above, the bag-shaped object 10 is gripped by the gripping finger portions 21B and 21D while maintaining a state in which the tip end portions of the press-in finger portions 21A and 21C are pressed into the bag-shaped object 10. Therefore, sufficient reaction force acts on the gripping finger portions 21B and 21D from the bag-shaped object 10. Accordingly, sufficient frictional force for gripping the bag-shaped object 10 is generated between the gripping finger portions 21B and 21D and the bag-shaped object 10. Hence, a state in which the bag-shaped object 10 is gripped by the gripping finger portions 21B and 21D can easily be maintained. As a result, the bag-shaped object 10 can be gripped by the hand mechanism 2 with stability.

Note, however, that when the gripping operation is performed by different gripping finger portions 21B and 21D to the press-in finger portions 21A and 21C, as in the second embodiment described above, the gripping finger portions 21B and 21D are brought into contact with the bag-shaped object 10 after the press-in operation is stopped, whereupon the bag-shaped object 10 is gripped by the gripping finger portions 21B and 21D. In contrast, when the gripping operation is performed using the press-in finger portions as the gripping finger portions, as in the first embodiment, the gripping finger portions are already in contact with the bag-shaped object 10 at the point where the press-in operation is stopped. Hence, the bag-shaped object can be gripped by the gripping finger portions immediately after the press-in operation is stopped. Therefore, when the gripping operation is performed using the press-in finger portions as the gripping finger portions, as in the first embodiment, the takt time required to grip the bag-shaped object 10 can be shortened in comparison with a case in which the gripping operation is performed by different gripping finger portions to the press-in finger portions, as in the second embodiment.

Note that in this embodiment, the gripping operation performed by the gripping finger portions 21B and 21D is started after the press-in operation performed by the press-in finger portions 21A and 21C is stopped. However, the gripping operation may be started while continuing the press-in operation when the pressure detected by any one of the pressure sensors 70 provided respectively on the press-in finger portions 21A and 21C reaches or exceeds a predetermined pressure. Further, the gripping operation can be executed by the hand mechanism 2 using the finger portions that were used as the press-in finger portions and a finger portion other than the press-in finger portions. Note that likewise in this case, the gripping operation is executed while maintaining the state in which the press-in finger portions are pressed into the bag-shaped object 10.

Modified Example

The press-in operation can also be performed using only one finger portion 21 of the hand mechanism 2 as a press-in finger portion. In this case, the press-in operation is stopped when the pressure detected by the pressure sensor 70 disposed on the press-in finger portion has reached or exceeded the predetermined pressure following the start of the press-in operation by the single press-in finger portion. The gripping operation is then executed by the gripping finger portions while maintaining a state in which the single press-in finger portion is pressed into the bag-shaped object 10.

Note, however, that when only one press-in finger portion is used, the press-in amount by which the press-in finger portion presses in the bag-shaped object 10 when executing the press-in operation is larger than that of a case where a plurality of press-in finger portions are used. In other words, when the press-in operation is performed using at least two finger portions as the press-in finger portions and in a state where at least a predetermined distance is secured between the tip end portions of the press-in finger portions, as in the examples shown in FIGS. 8 and 9 and FIG. 12, the press-in amount by which the press-in finger portions press in the bag-shaped object 10 in order to increase the internal pressure of the bag-shaped object 10 to an approximately identical degree can be reduced in comparison with a case where the press-in operation is performed using one press-in finger portion. In other words, the press-in amount by which the press-in finger portions press in the bag-shaped object 10 at the point where the press-in operation is stopped can be reduced. By reducing the press-in amount by which the press-in finger portions press in the bag-shaped object in this manner, it is possible to prevent the contents of the bag-shaped object 10 from being damaged during the press-in operation. Moreover, by reducing the press-in amount by which the press-in finger portions press in the bag-shaped object 10, the time from the start of the press-in operation to the start of the gripping operation can be shortened. As a result, the takt time required to grip the bag-shaped object can be shortened.

REFERENCE SIGNS LIST

1 Gripping system
2 Hand mechanism
20 Base portion
21 Finger portion
22 First joint portion
23 Second joint portion
211 First finger link portion
212 Second finger link portion
213 Base end portion
3 Arm mechanism
30*a* First joint portion
30*b* Second joint portion
30*c* Third joint portion
30*d* Fourth joint portion
30*e* Fifth joint portion
30*f* Sixth joint portion
31 First arm link portion
32 Second arm link portion
33 Third arm link portion
34 Fourth arm link portion
35 Fifth arm link portion
36 Connecting member
4 Support portion
42 Arm control device
420 Arm control unit
421 Motor state quantity acquisition unit
43 Hand control device
430 Object information acquisition unit
431 Hand control unit
432 Motor state quantity acquisition unit
433 Sensor information acquisition unit
70 Pressure sensor

The invention claimed is:

1. A gripping system comprising:
a hand mechanism for gripping an object using a plurality of finger portions; and
a control device for controlling the hand mechanism while gripping the object, wherein
when the object is a bag-shaped object with a fluid sealed in the interior thereof, at least one finger portion among the plurality of finger portions of the hand mechanism is used as a press-in finger portion,
a pressure detection unit is provided on a tip end portion of the finger portion that serves as the press-in finger portion of the hand mechanism, and
when the object is the bag-shaped object, the control device brings the tip end portion of the press-in finger portion of the hand mechanism into contact with the bag-shaped object and presses the tip end portion into the bag-shaped object, and subsequently, when the pressure detected by the pressure detection unit provided on the single press-in finger portion or brings the tip end portions of the press-in finger portions of the hand mechanism into contact with the bag-shaped object and presses the tip end, portions into the bag-shaped object, and subsequently, the pressure detected by any one of the pressure detection units provided respectively on the press-in finger portions reaches or exceeds a predetermined pressure, the control device executes a gripping operation, which is an operation for gripping the bag-shaped object, using at least two finger portions among the plurality of finger portions, in a state where the press-in finger portion is pressed into the bag-shaped object.

2. The gripping system according to claim 1, wherein the at least two finger portions are used as the press-in finger portions, and the control device brings the tip end portions of the press-in finger portions into contact with the bag-shaped object and presses the tip end portions into the bag-shaped object in a state where a distance between the tip end portions of the press-in finger portions is set at no less than a predetermined distance.

3. The gripping system according to claim 1, wherein the control device executes the gripping operation using the press-in finger portions while maintaining a state in which the press-in finger portions are pressed into the bag-shaped object.

4. The gripping system according to claim 1, wherein, when the at least two finger portions are used as the press-in finger portions, the control device brings the tip end portions of the press-in finger portions into contact with the bag-shaped object and presses the tip end portions into the bag-shaped object in a state where heights of the tip end portions of the press-in finger portions relative to a plane that is perpendicular to a press-in direction of the press-in finger portions are equal.

5. A gripping method for gripping an object using a hand mechanism having a plurality of finger portions, wherein
when the object is a bag-shaped object with a fluid sealed in the interior thereof at least one finger portion among the plurality of finger portions of the hand mechanism is used as a press-in finger portion, and
a pressure detection unit is provided on a tip end portion of the finger portion that serves as the press-in finger portion of the hand mechanism,
the gripping method comprising the steps of:
bringing the tip end portion of the press-in finger portion into contact with the bag-shaped object and pressing the tip end portion into the bag-shaped object when the object is the bag-shaped object; and
when the pressure detected by the pressure detection unit provided on the single press-in finger portion or the pressure detected by any one of the pressure detection units provided respectively on the press-in finger portions reaches or exceeds a predetermined pressure, executing a gripping operation, which is an operation for gripping the bad shaped object using at least two finger portions, among the plurality of finger portions, in a state where the press-in finger, portion is pressed into the bag-shaped object.

* * * * *